United States Patent
McGuire et al.

(10) Patent No.: US 9,777,792 B2
(45) Date of Patent: Oct. 3, 2017

(54) VARIABLE DAMPING SYSTEM USING A PIEZOELECTRIC DEVICE

(71) Applicant: GM GLOBAL TECHNOLOGY OPERATIONS LLC, Detroit, MI (US)

(72) Inventors: Michael E. McGuire, Milford, MI (US); Gary Klein, Royal Oak, MI (US); Charles C. Weddle, Waterford, MI (US); Robert P. Marble, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 14/960,624

(22) Filed: Dec. 7, 2015

(65) Prior Publication Data

US 2017/0159742 A1    Jun. 8, 2017

(51) Int. Cl.
| | | |
|---|---|---|
| *F16F 9/50* | (2006.01) | |
| *B60G 13/08* | (2006.01) | |
| *F16F 9/19* | (2006.01) | |
| *F16F 9/348* | (2006.01) | |
| *B60G 17/08* | (2006.01) | |
| *F16K 31/00* | (2006.01) | |

(52) U.S. Cl.
CPC ............... *F16F 9/50* (2013.01); *B60G 13/08* (2013.01); *B60G 17/08* (2013.01); *F16F 9/19* (2013.01); *F16F 9/348* (2013.01); *F16K 31/005* (2013.01); *B60G 2202/24* (2013.01); *B60G 2500/11* (2013.01)

(58) Field of Classification Search
CPC ..... F16F 9/50; F16F 9/19; F16F 9/348; B60G 13/08; B60G 17/08; B60G 2202/24; B60G 2500/11
USPC .......... 188/266.7, 282.4, 282.5, 283, 322.15, 188/299.1
See application file for complete search history.

(56) References Cited

U.S. PATENT DOCUMENTS

| | | | | |
|---|---|---|---|---|
| 5,154,263 A | * | 10/1992 | Lizell ........................ | F16F 9/50 188/266.2 |
| 5,996,745 A | * | 12/1999 | Jones, Jr. ......... | B60G 17/01941 188/266.7 |
| 6,164,424 A | * | 12/2000 | Girvin .............. | B60G 17/01941 188/266.7 |
| 6,193,029 B1 | * | 2/2001 | Crawley ................... | F16F 9/34 188/266.7 |

(Continued)

Primary Examiner — Thomas Irvin
(74) Attorney, Agent, or Firm — Quinn IP Law

(57) ABSTRACT

A damper assembly includes a housing and rod supported by the housing. A piston assembly is attached to the rod, and is positioned to separate an interior chamber of the housing into a first fluid chamber and a second fluid chamber. The piston assembly includes an annular plate that defines at least one orifice. The orifice interconnects the first fluid chamber and the second fluid chamber in fluid communication. The damper assembly includes a piezoelectric device that is moveable between a disengaged position and an engaged position, in response to a control signal. When disposed in the disengaged position, the piezoelectric device does not affect fluid flow through the at least one orifice. When disposed in the engaged position, the piezoelectric device does affect fluid flow through the at least one orifice, to adjust a damping rate of the piston assembly.

11 Claims, 2 Drawing Sheets

(56) References Cited

U.S. PATENT DOCUMENTS

| | | | | |
|---|---|---|---|---|
| 6,244,398 B1* | 6/2001 | Girvin | ............. | B60G 17/01941 |
| | | | | 188/282.5 |
| 6,298,958 B1* | 10/2001 | Hwang | ................ | F16F 9/3405 |
| | | | | 188/266.2 |
| 6,672,435 B2* | 1/2004 | Lemieux | ............... | F16F 9/3485 |
| | | | | 188/289 |
| 7,011,191 B2* | 3/2006 | Spicer | ....................... | E05F 5/00 |
| | | | | 188/161 |
| 8,104,591 B2* | 1/2012 | Barefoot | ................... | F16F 9/34 |
| | | | | 188/267.2 |
| 8,240,439 B2* | 8/2012 | Nakajima | ............ | F16F 9/3485 |
| | | | | 188/282.5 |
| 9,022,187 B2* | 5/2015 | Murata | .................... | F16F 6/00 |
| | | | | 188/322.14 |
| 2012/0145496 A1* | 6/2012 | Goetz | ................... | F16F 9/464 |
| | | | | 188/282.1 |

\* cited by examiner

VARIABLE DAMPING SYSTEM USING A PIEZOELECTRIC DEVICE

TECHNICAL FIELD

The disclosure generally relates to a damping system having a variable damping rate.

BACKGROUND

A damper assembly is a mechanical device that dissipates kinetic energy. The damper assembly converts the kinetic energy between two objects into heat, and then dissipates the heat. The damper assembly may include a fluid damper, which forces a viscous fluid through a small orifice in a piston, to control the relative movement between two objects. The damping assembly damps movement at a damping rate, which is dependent upon the resistance to the damping fluid flowing through the orifice. The damping rate may be varied or changed by changing the resistance to the damping fluid flowing through the orifice.

SUMMARY

A fluid metering device is provided. The fluid metering device includes a housing that defines a first fluid chamber and a second fluid chamber. A valve includes at least one orifice for controlling fluid flow between the first fluid chamber and the second fluid chamber. A piezoelectric device is moveable between at least a first position and a second position in response to a control signal. The piezoelectric device affects fluid flow through the at least one orifice at a first rate when disposed in the first position. The piezoelectric device affects fluid flow through the at least one orifice at a second rate when disposed in the second position.

A damper assembly is also provided. The damper assembly includes a housing that defines an interior chamber, and extends along a longitudinal axis. A rod is supported by the housing, and is at least partially disposed within the interior chamber of the housing. A piston assembly is attached to the rod within the interior chamber of the housing. The piston assembly is positioned to separate the interior chamber into at least a first fluid chamber and a second fluid chamber. The piston assembly is operable to resist relative movement between the rod and the housing at a damping rate. The piston assembly includes an annular plate that defines at least one orifice. The orifice interconnects the first fluid chamber and the second fluid chamber in fluid communication, to allow a damping fluid to flow therebetween. The damper assembly includes a piezoelectric device that is moveable between at least a disengaged position and an engaged position, in response to a control signal. When disposed in the disengaged position, the piezoelectric device does not affect fluid flow through the at least one orifice. When disposed in the engaged position, the piezoelectric device does affect fluid flow through the at least one orifice, to adjust the damping rate of the piston assembly.

A damping system is also provided. The damping system includes a control module that is operable to generate a control signal, and a damper assembly coupled to the control module. The damper assembly includes a piezoelectric device that is operable to move between an engaged position and a disengaged position in response to the control signal. The damper assembly includes a housing that defines an interior chamber, and a piston assembly disposed within the interior chamber and positioned to separate the interior chamber into a first fluid chamber and a second fluid chamber. The piston assembly includes an annular plate, which defines at least one orifice interconnecting the first fluid chamber and the second fluid chamber in fluid communication. A damping fluid is disposed within the interior chamber of the housing. The damping fluid is moveable through the at least one orifice, between the first fluid chamber and the second fluid chamber. When disposed in the disengaged position, the piezoelectric device does not affect fluid flow through the at least one orifice. When disposed in the engaged position, the piezoelectric device does affect fluid flow through the at least one orifice, to control a flow of the damping fluid through the at least one orifice and adjust a damping rate of the piston assembly.

Accordingly, a fluid flow rate through the aperture, such as the damping rate of the damper assembly, may be controlled by actuating the piezoelectric device, to provide different damping rates for different conditions. The piezoelectric device may be controlled actively by a control module, such as a brake control module or an engine control module of a vehicle, to actively control the damping rate on a real time basis. Alternatively, the damper assembly may be controlled to provide different operating modes, such as a "sport mode" or a "touring mode".

The above features and advantages and other features and advantages of the present teachings are readily apparent from the following detailed description of the best modes for carrying out the teachings when taken in connection with the accompanying drawings.

DETAILED DESCRIPTION

Figure 1:
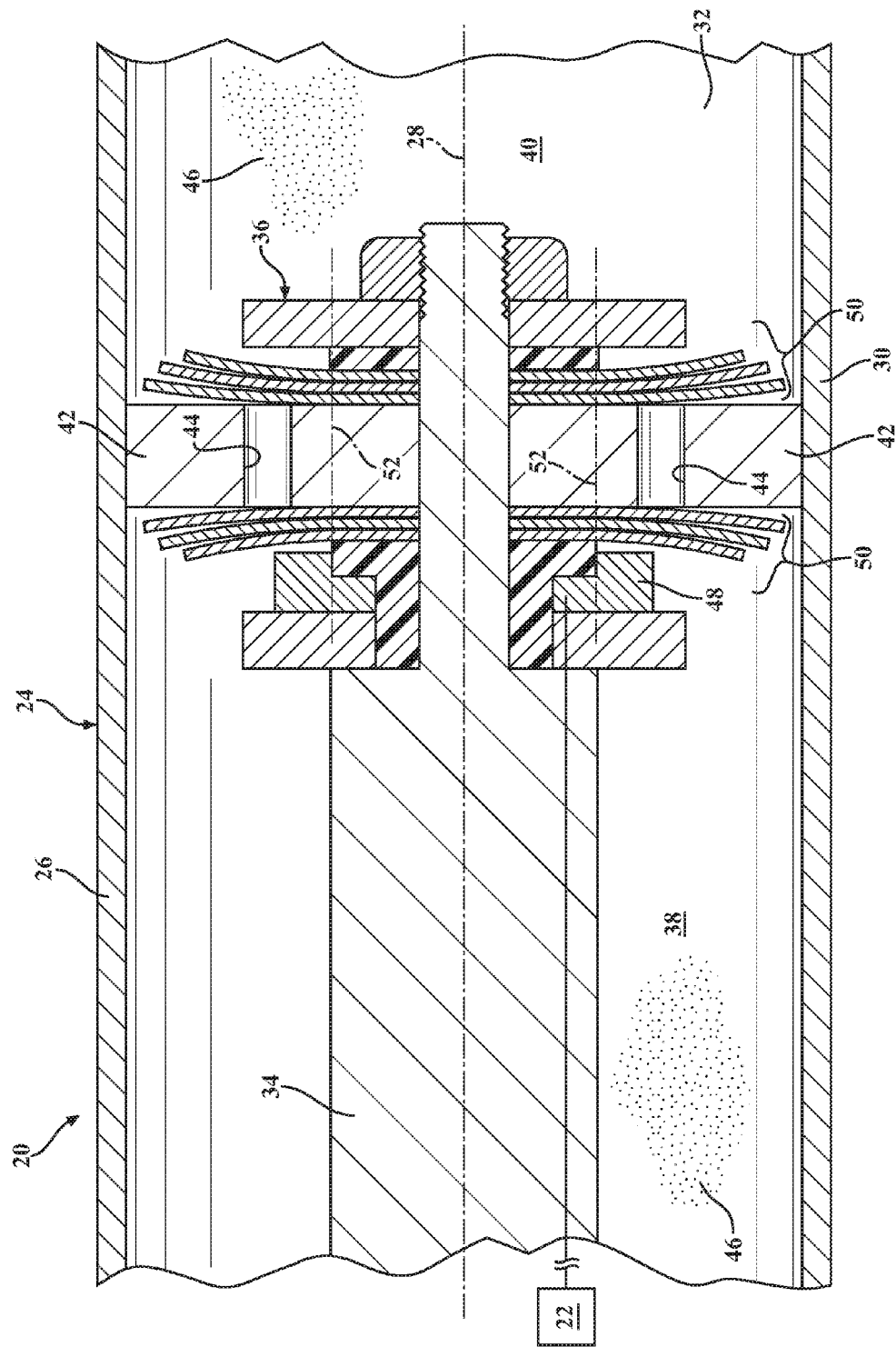
FIG. 1 is a schematic cross sectional view of a damping system, with a piezoelectric device disposed in a disengaged position.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a fluid metering device is generally shown and described. The fluid metering device may include any device capable of metering fluid between two different fluid chambers. One exemplary embodiment of the fluid metering device is a damper assembly, often referred to as a shock absorber. The fluid metering device is referred to as hereinafter as the damper assembly 24. While the invention is described herein using the exemplary embodiment of a damping system 20, which incorporates the damper assembly 24, it should be appreciated that the fluid metering device may be configured as some other device, such as but not limited to a power steering system.

The damping system 20 may be used to damp movement between two components, and/or absorb and dissipate kinetic energy. The damping system 20 may be embodied as a shock absorber system for a vehicle, such as an automobile, truck, motorcycle, snowmobile, airplane, tractor, etc. However, it should be appreciated that the damping system 20 may be used in other, non-vehicular applications, such as industrial machinery, or any other application requiring the damping of movement between two components.

The damping system 20 includes a control module 22, and a damper assembly 24 that is coupled to and controlled by the control module 22. In an exemplary embodiment shown in the Figures and described herein, the damper assembly 24 includes a housing 26. The housing 26 extends along a longitudinal axis 28, and includes an annular wall 30 that defines a sealed interior chamber 32. A rod 34 is moveably supported by the housing 26 for movement along the longitudinal axis 28 relative to the housing 26. The rod 34 and the housing 26 are generally concentric with each other, with their respective central axes defined by the longitudinal axis 28. The rod 34 is at least partially disposed within the interior chamber 32 of the housing 26. The housing 26 of the damper assembly 24 may include a first attachment end (not shown) that is configured for attachment to a first component (not shown), and the rod 34 may include a second attachment end (not shown) configured for attachment to a second component (not shown), as is known in the art. Relative movement between the first component and the second component causes the rod 34 and the housing 26 to move relative to each other along the longitudinal axis 28.

A piston assembly 36 is attached to the rod 34, within the interior chamber 32 of the housing 26. The piston assembly 36 is positioned to separate the interior chamber 32 of the housing 26 into at least a first fluid chamber 38, and a second fluid chamber 40. The piston assembly 36 includes a valve that defines at least one orifice 44. As shown in the exemplary embodiment, the valve includes an annular plate 42 that defines the least one orifice 44. The annular plate 42 moves with the rod 34, relative to the housing 26. An outer radial surface of the annular plate 42 is disposed in sealing engagement with an interior surface of the annular wall 30 of the housing 26. In some embodiments, the annular plate 42 may include a plurality of orifices 44 disposed radially about the longitudinal axis 28. However, the number and position of the orifices 44 may vary depending upon the specific application for the damping system 20.

A damping fluid 46 is disposed within the interior chamber 32 of the housing 26. Each of the orifices 44 interconnect the first fluid chamber 38 and the second fluid chamber 40 in fluid communication, to allow the damping fluid 46 to flow between the first fluid chamber 38 and the second fluid chamber 40. The damping fluid 46 is moveable through the orifices 44, between the first fluid chamber 38 and the second fluid chamber 40, in response to relative movement between the rod 34 and the housing 26. The damping fluid 46 may include any viscous fluid, such as but not limited to an oil. While the damping fluid 46 may include a magnetorheological fluid, the use of a magnetorheological fluid as the damping fluid 46 is not required for the proper function of the damper assembly 24, nor is a magnetorheological fluid required to change a damping rate of the damper assembly 24.

The piston assembly 36 is operable to resist relative movement between the rod 34 and the housing 26 at the damping rate, by resisting a flow of the damping fluid 46 through the orifices 44, as is known in the art. The "damping rate" is defined herein as the force generated by the flow of the damping fluid 46 through the orifices 44 used to resist relative movement between the housing 26 and the rod 34.

The damping system 20 includes a piezoelectric device 48. The piezoelectric device 48 may include any device that uses piezoelectric materials to convert an electrical signal, i.e., a control signal from the control module 22, into movement. The piezoelectric device 48 is moveable between at least a first position and a second position. When disposed in the first position, the piezoelectric device 48 affects fluid flow through the orifices at a first rate. As shown and described in the exemplary embodiment herein, the first position may be defined as a disengaged position, and the first rate may include or be defined as not affecting fluid flow through the orifices 44. However, it should be appreciated that the first position may include an engaged position so as to affect fluid flow through the orifices 44 to at least a certain degree. As shown and described in the exemplary embodiment herein, the second position may be defined as an engaged position, and the second rate may include or be defined as affecting fluid flow through the orifices 44. As such, it should be appreciated that fluid flow through the orifices when the piezoelectric device 44 is positioned in the second or engaged state is affected to a different degree than when the piezoelectric device 44 is positioned in the first or disengaged position.

Figure 2:
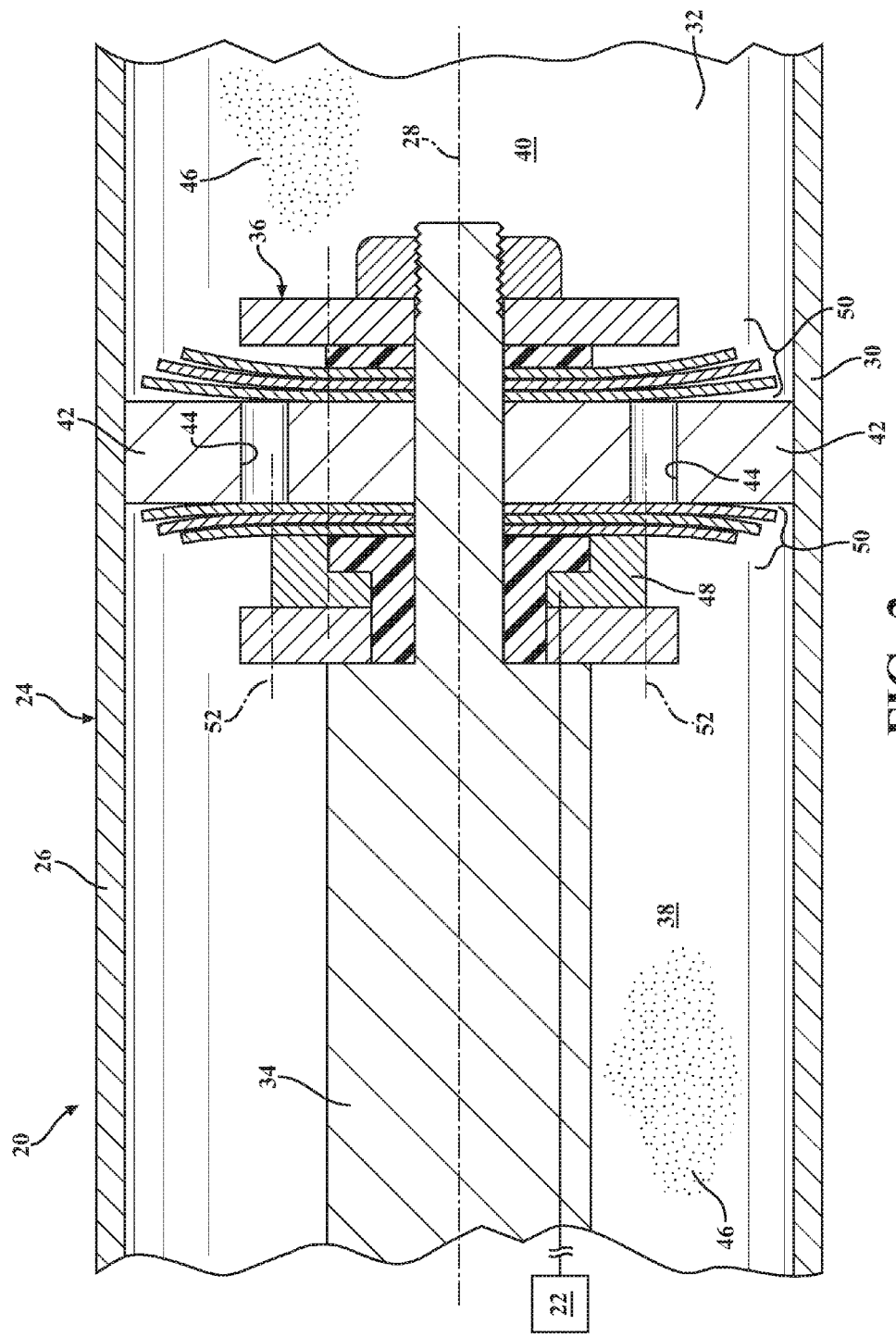
FIG. 2 is a schematic cross sectional view of the damping system, with the piezoelectric device disposed in an engaged position to adjust a damping rate of the damper assembly.

The first or disengaged position of the exemplary embodiment is shown in FIG. 1, and the second or engaged position of the exemplary embodiment is shown in FIG. 2. The piezoelectric device moves between the first position and the second position in response to the control signal provided by the control module 22. In some embodiments, the piezoelectric device 48 may be moveable along the longitudinal axis 28 to at least one intermediate position, or a plurality of intermediate positions, which is/are disposed between the engaged position and the disengaged position.

In the exemplary embodiment shown in the Figures and described herein, the piezoelectric device 48 is disposed within the interior chamber 32 of the housing 26, and is attached to the rod 34 adjacent the piston assembly 36. The piston assembly 36 and the piezoelectric device 48 may be attached to the rod 34 in any suitable manner capable of securing the piston assembly 36 and the piezoelectric device 48 in position relative to the rod 34 and each other. The piezoelectric device 48 moves linearly along the longitudinal axis 28 in response to the control signal, to move between the disengaged position and engaged position.

While the exemplary embodiment shown in the Figures and described herein includes the piezoelectric device 48 within the interior chamber 32 of the housing 26 and adjacent the piston assembly 36, it should be appreciated that the piezoelectric device 48 may be positioned at some other location or position of the damping system 20 that is capable of affecting a change in the damping rate of the damper assembly 24.

In the exemplary embodiment shown, when disposed in the disengaged position, the piezoelectric device 48 does not engage the piston assembly 36, and therefore does not affect fluid flow through the orifices 44 of the annular plate 42. When disposed in the engaged position, the piezoelectric device 48 moves linearly along the longitudinal axis 28 into engagement with the piston assembly 36 to affect fluid flow through the orifices 44, and thereby adjust the damping rate of the piston assembly 36. As noted above, the damper assembly 24 may be configured to move the piezoelectric device 48 into one or more intermediate positions, to affect fluid flow through the orifices 44 to varying degrees, to provide variable damping rates.

As shown in the Figures of the exemplary embodiment, the piston assembly 36 includes at least one valve disc disposed adjacent a face of the annular plate 42. In some embodiments, the piston assembly 36 includes a plurality of valve discs stacked one next to the other, and disposed between the piezoelectric device 48 and the annular plate 42.

The valve disks 50 are bendable relative to the rod 34 and the annular plate 42 about a spring point 52. Referring to FIG. 1, the spring point 52 is defined by an annular contact ring disposed about the longitudinal axis 28, where the valve disks 50 engage or contact the outer annular surface of the rod 34. The valve disks 50 bend about the spring point 52 in response to a fluid pressure applied to the valve disks 50 by the damping fluid 46. The fluid pressure is generated by the relative movement between the housing 26 and the rod 34. The bending of the valve disks 50 about the spring point 52 affects the flow of the damping fluid 46 through the orifices 44, to control fluid flow through the orifices 44, between the first fluid chamber 38 and the second fluid chamber 40.

Referring to FIG. 2, when the piezoelectric device 48 is disposed in the engaged position, the piezoelectric device 48 engages or contacts the valve disks 50 to move the spring point 52, about which the valve disks 50 bend, radially outward relative to the longitudinal axis 28. Moving the spring point 52 about which the valve disks 50 bend changes the fluid pressure required to bend the valve disks 50, thereby affecting or changing the damping rate of the damper assembly 24. By engaging the piezoelectric device 48 and moving the piezoelectric device 48 into the engaged position, thereby moving the spring point 52 radially outward toward the outer radial edge of the valve disks 50, the resistance of the valve disks 50 to bending is increased, thereby increasing the amount of fluid pressure the damping fluid 46 must exert on the valve discs to affect the flow of the damping fluid 46 through the orifices 44.

Additionally, referring to FIG. 2, when the piezoelectric device 48 is disposed in the engaged position, the piezoelectric device 48 may at least partially block one or more of the orifices 44, to reduce the area of the orifices 44 and control the flow of the damping fluid 46 through the at least one orifice 44, thereby affecting the damping rate of the damper assembly 24. It should be appreciated that the piezoelectric device 48 may partially block and/or completely block one or more of the orifices 44, depending upon the specific application and desired change to the damping rate of the damper assembly 24.

As noted above, the control module 22 is operable to generate the control signal, which is communicated to the piezoelectric device 48 for controlling the piezoelectric device 48 between at least the engaged position and the disengaged position. The control module 22 may include for example, but is not limited to, a brake control module 22 or an engine control module 22 of a vehicle. The control module 22 may include a computer and/or processor, and include all software, hardware, memory, algorithms, connections, sensors, etc., necessary to manage and control the operation of the damper assembly 24. It should be appreciated that the control module 22 may include any device capable of analyzing data from various sensors, comparing data, making the necessary decisions required to control the operation of the damper assembly 24, and executing the required tasks necessary to generate and communicate the control signal to the damper assembly 24 to control the operation of the damper assembly 24.

The control module 22 may control the damper assembly 24 to change the damping rate between a discrete number of pre-defined damping rates to provide different driving modes, such as but not limited to a "sport" mode, a "touring" mode, a "snow" mode, etc. Alternatively, the control module 22 may continuously and actively control the damping rate of the damper assembly 24 between an infinite number of damping rates to provide active, real time damping for the current operating condition of the vehicle.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A fluid metering device comprising:
 a housing defining a first fluid chamber and a second fluid chamber;
 a valve having at least one orifice for controlling fluid flow between the first fluid chamber and the second fluid chamber;
 a piezoelectric device moveable between at least a first position and a second position, wherein the piezoelectric device affects fluid flow through the at least one orifice when disposed in the first position at a first rate, and wherein the piezoelectric device affects fluid flow through the at least one orifice when disposed in the second position at a second rate;
 wherein the valve includes at least one valve disc;
 wherein the at least one valve disk is bendable about a spring point in response to a fluid pressure to control fluid flow through the at least one orifice, between the first fluid chamber and the second fluid chamber; and
 wherein the piezoelectric device engages the at least one valve disk to move the spring point, about which the at least one valve disk bends, radially outward relative to a longitudinal axis, to change the fluid pressure required to bend the at least one valve disk when the piezoelectric device is disposed in the second position.

2. The damper assembly set forth in claim 1 wherein the piezoelectric device partially blocks the at least one orifice when disposed in the second position to reduce fluid flow through the at least one orifice.

3. A damper assembly comprising:
 a housing defining an interior chamber, and extending along a longitudinal axis;
 a rod supported by the housing and at least partially disposed within the interior chamber of the housing;
 a piston assembly attached to the rod within the interior chamber of the housing, and positioned to separate the interior chamber into at least a first fluid chamber and a second fluid chamber, and operable to resist relative movement between the rod and the housing at a damping rate;
 wherein the piston assembly includes an annular plate defining at least one orifice interconnecting the first fluid chamber and the second fluid chamber in fluid communication;
 a piezoelectric device moveable between at least a disengaged position and an engaged position in response to a control signal, wherein the piezoelectric device does not affect fluid flow through the at least one orifice when disposed in the disengaged position, and wherein the piezoelectric device does affect fluid flow through the at least one orifice when disposed in the engaged position to adjust the damping rate of the piston assembly;
 wherein the piston assembly includes at least one valve disc disposed adjacent a face of the annular plate, between the piezoelectric device and the annular plate;

wherein the at least one valve disk is bendable relative to the rod about a spring point in response to a fluid pressure to control fluid flow through the at least one orifice, between first fluid chamber and the second fluid chamber; and wherein the piezoelectric device engages the at least one valve disk to move the spring point, about which the at least one valve disk bends, radially outward relative to the longitudinal axis, to change the fluid pressure required to bend the at least one valve disk when the piezoelectric device is disposed in the engaged position.

4. The damper assembly set forth in claim 3 wherein the piezoelectric device is disposed within the interior chamber of the housing, and is attached to the rod adjacent the piston assembly.

5. The damper assembly set forth in claim 4 wherein the piezoelectric device moves linearly along the longitudinal axis in response to the control signal, to move between the disengaged position and engaged position.

6. The damper assembly set forth in claim 5 wherein the piezoelectric device is moveable along the longitudinal axis to at least one intermediate position disposed between the engaged position and the disengaged position.

7. The damper assembly set forth in claim 5 wherein the piezoelectric device partially blocks the at least one orifice when disposed in the engaged position to reduce fluid flow through the at least one orifice.

8. The damper assembly set forth in claim 3 wherein the at least one orifice includes a plurality of orifices, and wherein the piezoelectric device completely blocks at least one of the plurality of orifices when disposed in the engaged position.

9. A damping system comprising:
a control module operable to generate a control signal;
a damper assembly coupled to the control module, and including a piezoelectric device operable to move between an engaged position and a disengaged position in response to the control signal;
wherein the damper assembly includes a housing defining an interior chamber, and a piston assembly disposed within the interior chamber and positioned to separate the interior chamber into a first fluid chamber and a second fluid chamber;
wherein the piston assembly includes an annular plate defining at least one orifice interconnecting the first fluid chamber and the second fluid chamber in fluid communication;
a damping fluid disposed within the interior chamber of the housing, and moveable through the at least one orifice between the first fluid chamber and the second fluid chamber;
wherein the piezoelectric device does not affect fluid flow through the at least one orifice when disposed in the disengaged position,
wherein the piezoelectric device does affect fluid flow through the at least one orifice when disposed in the engaged position to control a flow of the damping fluid through the at least one orifice and adjust a damping rate of the piston assembly;
wherein the piston assembly includes at least one valve disc disposed adjacent a face of the annular plate, between the piezoelectric device and the annular plate;
wherein the at least one valve disk is bendable relative to the rod about a spring point in response to a fluid pressure applied by the damping fluid to control fluid flow through the at least one orifice, between first fluid chamber and the second fluid chamber; and
wherein the piezoelectric device engages the at least one valve disk to move the spring point, about which the at least one valve disk bends, radially outward relative to a longitudinal axis, to change the fluid pressure required to bend the at least one valve disk when the piezoelectric device is disposed in the engaged position.

10. The damping system set forth in claim 9 further comprising:
a rod supported by the housing and at least partially disposed within the interior chamber of the housing, wherein the piston assembly is attached to the rod;
wherein the piezoelectric device is disposed within the interior chamber of the housing, and is attached to the rod adjacent the piston assembly; and
wherein the piezoelectric device moves linearly along the longitudinal axis in response to the control signal, to move between the disengaged position and engaged position.

11. The damping system set forth in claim 9 wherein the piezoelectric device partially blocks the at least one orifice when disposed in the engaged position to reduce fluid flow through the at least one orifice.

* * * * *